US012173393B2

(12) United States Patent
Kwon et al.

(10) Patent No.: US 12,173,393 B2
(45) **Date of Patent: *Dec. 24, 2024**

(54) FE-BASED NANOCRYSTALLINE ALLOY AND ELECTRONIC COMPONENT USING THE SAME

(71) Applicant: SAMSUNG ELECTRO-MECHANICS CO., LTD., Suwon-si (KR)

(72) Inventors: Sang Kyun Kwon, Suwon-si (KR); Han Wool Ryu, Suwon-si (KR); Chul Min Sim, Suwon-si (KR); Chang Hak Choi, Suwon-si (KR); Jong Suk Jeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,666

(22) Filed: Jan. 9, 2023

(65) Prior Publication Data

US 2023/0160047 A1 May 25, 2023

Related U.S. Application Data

(63) Continuation of application No. 16/011,131, filed on Jun. 18, 2018, now abandoned.

(30) Foreign Application Priority Data

Aug. 18, 2017 (KR) ........................ 10-2017-0105060
Nov. 1, 2017 (KR) ........................ 10-2017-0144474

(51) Int. Cl.
*C22C 45/02* (2006.01)
*C22C 38/00* (2006.01)
(Continued)

(52) U.S. Cl.
CPC ............ *C22C 45/02* (2013.01); *C22C 38/002* (2013.01); *C22C 38/02* (2013.01); *C22C 38/12* (2013.01);
(Continued)

(58) Field of Classification Search
CPC ............ C22C 2200/02; C22C 2200/04; C22C 45/02; H01F 1/15308; H01F 1/15333; H01F 2017/048
(Continued)

(56) References Cited

U.S. PATENT DOCUMENTS 6,425,960 B1 7/2002 Yoshizawa et al.
8,083,867 B2 12/2011 Yoshizawa et al.
(Continued)

FOREIGN PATENT DOCUMENTS

CN 101840763 A 9/2010
CN 101935812 A 1/2011
(Continued)

OTHER PUBLICATIONS

NPL: on-line English translation of CN 101840763 A, Sep. 2010 (Year: 2010).*
(Continued)

*Primary Examiner* — Jie Yang
(74) *Attorney, Agent, or Firm* — MORGAN, LEWIS & BOCKIUS LLP

(57) ABSTRACT

An Fe-based nanocrystalline alloy is represented by Composition Formula, $(Fe_{(1-a)}M^1a)_{100-b-c-d-e-g}M^2_bB_cP_dCu_eM^3_g$, where $M^1$ is at least one element selected from the group consisting of Co and Ni, $M^2$ is at least one element selected from the group consisting of Nb, Mo, Zr, Ta, W, Hf, Ti, V, Cr, and Mn, $M^3$ is at least two elements selected from the
(Continued)

100 group consisting of C, Si, Al, Ga, and Ge but necessarily includes C, and 0≤a≤0.5, 1.5<b≤3, 10≤c≤13, 0<d≤4, 0<e≤1.5, and 8.5≤g≤12.

6 Claims, 6 Drawing Sheets

(51) Int. Cl.

| | |
|---|---|
| ***C22C 38/02*** | (2006.01) |
| ***C22C 38/12*** | (2006.01) |
| ***C22C 38/20*** | (2006.01) |
| ***H01F 1/153*** | (2006.01) |
| ***H01F 17/00*** | (2006.01) |
| ***H01F 17/04*** | (2006.01) |
| ***H01F 27/29*** | (2006.01) |
| *C21D 6/00* | (2006.01) |

(52) U.S. Cl.

CPC ......... *C22C 38/20* (2013.01); *H01F 1/15308* (2013.01); *H01F 1/15333* (2013.01); *H01F 17/0013* (2013.01); *H01F 17/04* (2013.01); *H01F 27/292* (2013.01); *C21D 6/008* (2013.01); *C22C 2200/02* (2013.01); *C22C 2200/04* (2013.01); *H01F 2017/048* (2013.01)

(58) Field of Classification Search

USPC .......................................................... 148/304

See application file for complete search history.

(56) References Cited

U.S. PATENT DOCUMENTS

| | | | | |
|---|---|---|---|---|
| 8,491,731 | B2 | 7/2013 | Makino et al. | |
| 10,388,444 | B2 | 8/2019 | Makino et al. | |
| 11,104,982 | B2 * | 8/2021 | Kwon | H01F 17/0013 |
| 2008/0117014 | A1 | 5/2008 | Waeckerle et al. | |
| 2009/0065100 | A1 | 3/2009 | Yoshizawa et al. | |
| 2009/0242825 | A1 | 10/2009 | Ohwaki et al. | |
| 2010/0043927 | A1 | 2/2010 | Makino | |
| 2010/0097171 | A1 | 4/2010 | Urata et al. | |
| 2016/0336104 | A1 * | 11/2016 | Noguchi | C22C 33/0264 |
| 2017/0117082 | A1 | 4/2017 | Jeong | |
| 2018/0122540 | A1 | 5/2018 | Matsumoto et al. | |
| 2019/0100828 | A1 | 4/2019 | Kwon et al. | |

FOREIGN PATENT DOCUMENTS

| | | | |
|---|---|---|---|
| CN | 102412045 | A | 4/2012 |
| CN | 102610348 | A | 7/2012 |
| CN | 102741437 | A | 10/2012 |
| CN | 102787282 | A | 11/2012 |
| CN | 102936685 | A | 2/2013 |
| CN | 103310936 | A | 9/2013 |
| CN | 105741998 | A | 7/2016 |
| CN | 105810383 | A | 7/2016 |
| EP | 0 342 921 | A2 | 11/1989 |
| EP | 2 243 854 | A1 | 10/2010 |
| JP | H01-290744 | A | 11/1989 |
| JP | 2007-182594 | A | 7/2007 |
| JP | 5182601 | B2 | 4/2013 |
| JP | 2014-167953 | A | 9/2014 |
| JP | 5632608 | B2 | 11/2014 |
| KR | 10-2011-0044832 | A | 5/2011 |
| KR | 10-2017-0048724 | A | 5/2017 |
| WO | 2006/048533 | A1 | 5/2006 |

OTHER PUBLICATIONS

Office Action issued in corresponding Korean Patent Application No. 201810896399.4 dated Dec. 30, 2019, with English translation.

Office Action issued in corresponding Korean Patent Application No. 10-2017-0144474 dated Feb. 23, 2022, with English translation.

Office Action issued in corresponding Japanese Patent Application No. 2018-11740 dated Aug. 23, 2022, English translation.

Japanese Office Action dated Jan. 25, 2022 issued in Japanese Patent Application No. 2018-117410 (with English translation).

Office Action issued in corresponding U.S. Appl. No. 16/011,131 dated Jul. 30, 2020.

Final Office Action issued in corresponding U.S. Appl. No. 16/011,131 dated Dec. 21, 2020.

Office Action issued in corresponding U.S. Appl. No. 16/011,131 dated May 5, 2021.

Final Office Action issued in corresponding U.S. Appl. No. 16/011,131 dated Aug. 13, 2021.

Notice of Allowance issued in corresponding U.S. Appl. No. 16/011,131 dated Nov. 23, 2021.

Office Action issued in corresponding U.S. Appl. No. 16/011,131 dated Apr. 22, 2022.

Final Office Action issued in corresponding U.S. Appl. No. 16/011,131 dated Aug. 8, 2022.

* cited by examiner

FE-BASED NANOCRYSTALLINE ALLOY AND ELECTRONIC COMPONENT USING THE SAME

CROSS-REFERENCE TO RELATED APPLICATION(S)

This application is the continuation of U.S. patent application Ser. No. 16/011,131 filed on Jun. 18, 2018, which claims the benefit of priority to Korean Patent Application Nos. 10-2017-0105060 filed on Aug. 18, 2017 and 10-2017-0144474 filed on Nov. 1, 2017 in the Korean Intellectual Property Office, the disclosures of which are incorporated herein by reference in their entirety.

BACKGROUND

1. Field

The present disclosure relates to an Fe-based nanocrystalline alloy and an electronic component using the same.

2. Description of Related Art

In technical fields including devices such as an inductor, a transformer, a motor magnetic core, a wireless power transmission device, and the like, there has been research to develop a soft magnetic material having a small size and improved high-frequency properties. Recently, research has been conducted into an Fe-based nanocrystalline alloy.

The Fe-based nanocrystalline alloy has advantages in that it has high permeability and a saturation magnetic flux density two times greater than that of existing ferrite, and it operates at a high frequency, as compared to an existing metal.

Recently, a novel nanocrystalline alloy composition for improving saturation magnetic flux density has been developed to improve the performance of the Fe-based nanocrystalline alloy. Particularly, in magnetic induction type wireless power transmission equipment, a magnetic material is used to decrease an influence of electromagnetic interference (EMI)/electromagnetic compatibility (EMC) caused by a surrounding metal material and improve wireless power transmission efficiency.

As the magnetic material, for efficiency improvement, slimming and lightening of a device, and particularly, high speed charging capability, a magnetic material having a high saturation magnetic flux density has been used. However, such a magnetic material having a high saturation magnetic flux density may have a high loss and may generate heat, such that there are drawbacks when using this magnetic material.

SUMMARY

An aspect of the present disclosure may provide an Fe-based nanocrystalline alloy having a low loss while having a high saturation magnetic flux density due to an excellent amorphous property of a parent phase, and an electronic component using the same. The Fe-based nanocrystalline alloy as described above has advantages in that nanocrystalline grains may be easily formed even in a form of powder, and magnetic properties such as the saturation magnetic flux density, and the like, are excellent.

According to an aspect of the present disclosure, an Fe-based nanocrystalline alloy may be represented by a Composition Formula, $(Fe_{(1-a)}M^1_{a})_{100-b-c-d-e-g}M^2_bB_cP_dCu_eM^3_g$, where $M^1$ is at least one element selected from the group consisting of Co and Ni, $M^2$ is at least one element selected from the group consisting of Nb, Mo, Zr, Ta, W, Hf, Ti, V, Cr, and Mn, $M^3$ is at least two elements selected from the group consisting of C, Si, Al, Ga, and Ge but necessarily includes C, and $0 \le a \le 0.5$, $1.5 < b \le 3$, $10c \le 13$, $0 \le d \le 4$, $0 < e \le 1.5$, and $8.5 \le g \le 12$.

A ratio of a weight of C to a sum of weights of Fe and C may be within a range from 0.1% or more to 0.7% or less.

The Fe-based nanocrystalline alloy may be in a powder form, and the powder may be composed of particles having a size distribution with a $D_{50}$ of 20 um or more.

A parent phase of the Fe-based nanocrystalline alloy may have an amorphous single phase structure.

An average size of a crystalline grain after heat treatment may be 50 nm or less.

A saturation magnetic flux density of the Fe-based nanocrystalline alloy may be 1.4 T or more.

According to another aspect of the present disclosure, an electronic component may include: a coil part; and an encapsulant encapsulating the coil part and containing an insulator and a large number of magnetic particles dispersed in the insulator, wherein the magnetic particles contain an Fe-based nanocrystalline alloy represented by Composition Formula, $(Fe_{(1-a)}M^1_{a})_{100-b-c-d-e-g}M^2_bB_cP_dCu_eM^3_g$, where $M^1$ is at least one element selected from the group consisting of Co and Ni, $M^2$ is at least one element selected from the group consisting of Nb, Mo, Zr, Ta, W, Hf, Ti, V, Cr, and Mn, $M^3$ is at least two elements selected from the group consisting of C, Si, Al, Ga, and Ge but necessarily includes C, and $0 \le a \le 0.5$, $1.5 < b \le 3$, $10 \le c \le 13$, $0 \le d \le 4$, $0 < e \le 1.5$, and $8.5 \le g \le 12$.

A ratio of a weight of C to a sum of weights of Fe and C may be within a range from 0.1% or more to 0.7% or less.

The magnetic particles may have a size distribution with a $D_{50}$ of 20 um or more.

A parent phase of the Fe-based nanocrystalline alloy may have an amorphous single phase structure.

An average size of a crystalline grain after heat treatment may be 50 nm or less.

A saturation magnetic flux density of the Fe-based nanocrystalline alloy may be 1.4 T or more.

According to another aspect of the present disclosure, an electronic component comprises: a body including a coil part; and external electrodes formed on outer surfaces of the body and connected to the coil part. The body includes an Fe-based nanocrystalline alloy represented by Composition Formula, $(Fe_{(1-a)}M^1_{a})_{100-b-c-d-e-f-g}M^2_bB_cP_dCu_eC_fM^3_g$, where $M^1$ is at least one element selected from the group consisting of Co and Ni, $M^2$ is at least one element selected from the group consisting of Nb, Mo, Zr, Ta, W, Hf, Ti, V, Cr, and Mn, $M^3$ is at least one element selected from the group consisting of Si, Al, Ga, and Ge, and $0 \le a \le 0.5$, $1.5 < b \le 3$, $10c \le 13$, $0 \le d \le 4$, $0 < e \le 1.5$, and $6 \le g \le 11.5$.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Electronic Component

Hereinafter, an electronic component according to an exemplary embodiment in the present disclosure will be described, and as a representative example, a coil component was selected. However, an Fe-based nanocrystalline alloy to be described below may also be applied to other electronic components, for example, a wireless charging device, a filter, and the like, as well as the coil component.

Figure 1:
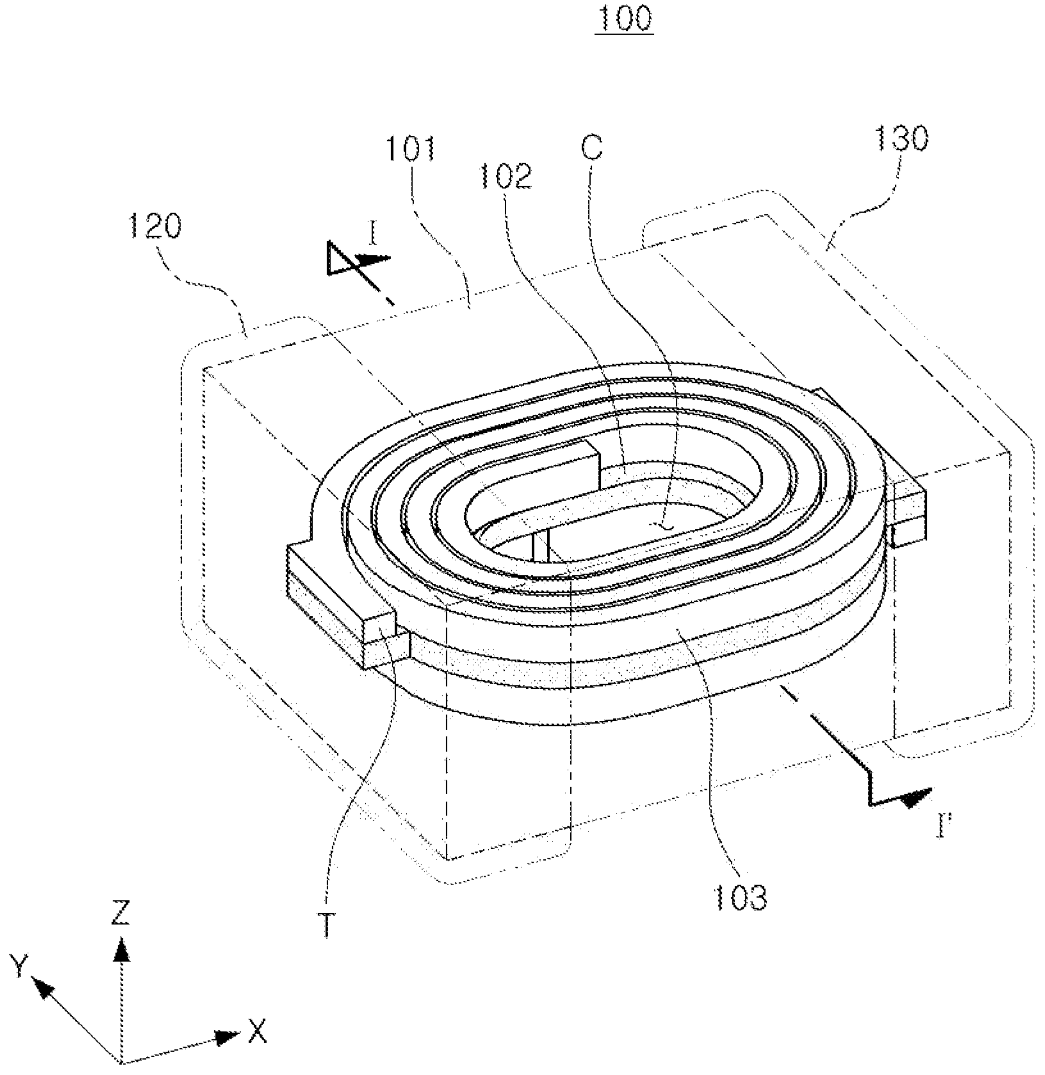
FIG. 1 is a schematic perspective view illustrating a coil component according to an exemplary embodiment in the present disclosure.
Figure 2:
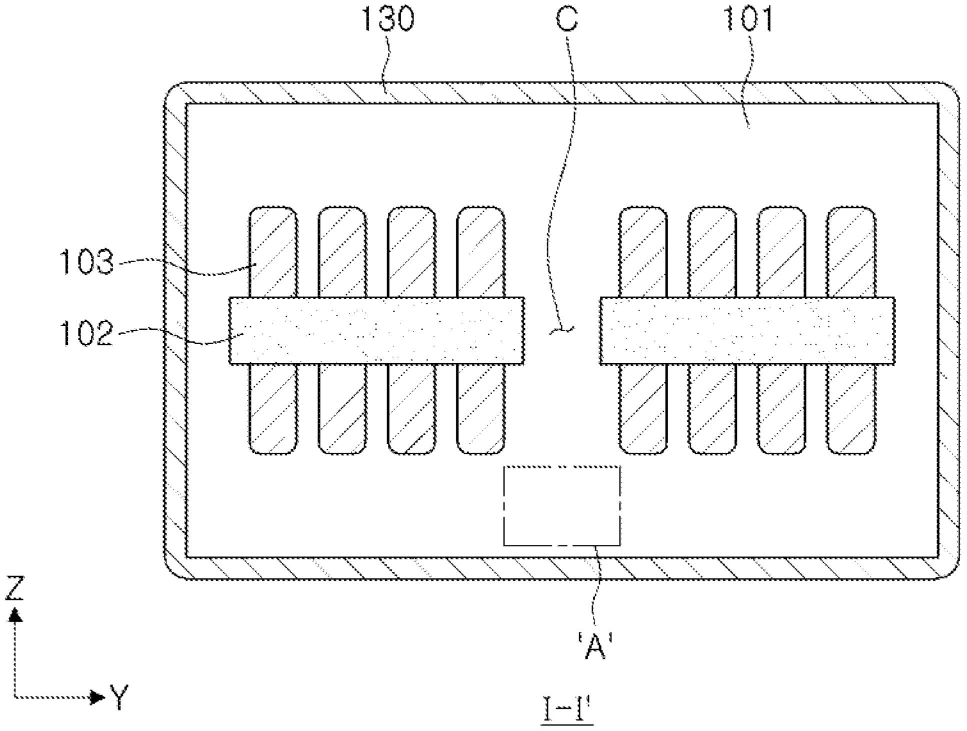
FIG. 2 is a cross-sectional view taken along line I-I' of FIG. 1.
Figure 3:
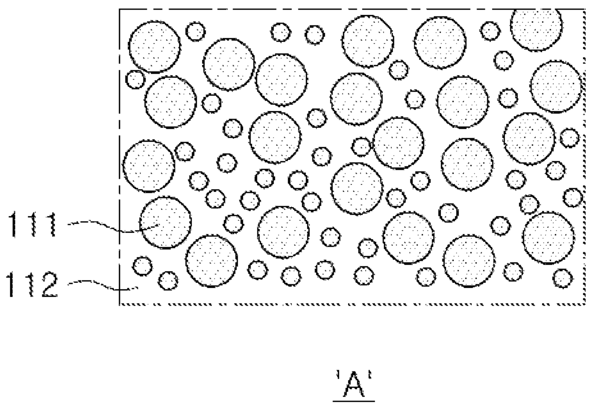
FIG. 3 is an enlarged view of a region of an encapsulant in the coil component of FIG. 2.

FIG. 1 is a perspective view schematically illustrating an exterior of a coil component according to an exemplary embodiment in the present disclosure. Further, FIG. 2 is a cross-sectional view taken along line I-I' of FIG. 1. FIG. 3 is an enlarged view of a region of an encapsulant in the coil component of FIG. 2.

Referring to FIGS. 1 and 2, a coil component 100 according to the present exemplary embodiment may have a structure including a coil part 103, an encapsulant 101, and external electrodes 120 and 130.

The encapsulant 101 may encapsulate the coil part 103 to protect the coil part 103, and may contain a large number of magnetic particles 111 as illustrated in FIG. 3. More specifically, the magnetic particles 111 may be in a state in which the magnetic particles 111 are dispersed in an insulator 112 formed of a resin, or the like. In this case, the magnetic particles 111 may contain a Fe-based nanocrystalline alloy, and a specific composition thereof will be described below. When the Fe-based nanocrystalline alloy having the composition suggested in the present exemplary embodiment is used, even in a case of preparing the Fe-based nanocrystalline alloy in a form of powder, a size, a phase, and the like, of a nanocrystalline grain may be suitably controlled, such that the nanocrystalline grain exhibits magnetic properties suitable for being used in an inductor.

The coil part 103 may perform various functions in an electronic device through properties exhibited in a coil of the coil component 100. For example, the coil component 100 may be a power inductor. In this case, the coil part 103 may serve to store electricity in a form of a magnetic field to maintain an output voltage, thereby stabilizing power, or the like. In this case, coil patterns constituting the coil part 103 may be stacked on both surfaces of a support member 102, respectively, and electrically connected to each other by a conductive via penetrating through the support member 102. The coil part 103 may be formed in a spiral shape, and include lead portions T formed in outermost portion of the spiral shape to be exposed to the outside of the encapsulant 101 for electrical connection with the external electrodes 120 and 130. The coil pattern constituting the coil part 103 may be formed using a plating method used in the art, for example, a pattern plating method, an anisotropic plating method, an isotropic plating method, or the like. The coil pattern may be formed to have a multilayer structure using two or more of the above-mentioned methods.

The support member 102 supporting the coil part 103 may be formed of, for example, a polypropylene glycol (PPG) substrate, a ferrite substrate, a metal-based soft magnetic substrate, or the like. In this case, a through hole may be formed in a central region of the support member 102, and filled with a magnetic material to form a core region C. This core region C may constitute a portion of the encapsulant 101. As described above, as the core region C may be formed to be filled with the magnetic material, performance of the coil component 100 may be improved.

The external electrodes 120 and 130 may be formed on an outer portion of the encapsulant 101 and connected to the lead portions T, respectively. The external electrodes 120 and 130 may be formed using a conductive paste containing a metal having excellent electric conductivity, wherein the conductive paste may be a conductive paste containing, for example, one of nickel (Ni), copper (Cu), tin (Sn), and silver (Ag), alloys thereof, or the like. Further, plating layers (not illustrated) may be further formed on the external electrodes 120 and 130. In this case, the plating layer may contain any one or more selected from the group consisting of nickel (Ni), copper (Cu), and tin (Sn). For example, nickel (Ni) layers and tin (Sn) layers may be sequentially formed.

As described above, according to the present exemplary embodiment, at the time of preparing the magnetic particles 111 in a form of powder, the magnetic particle 111 may contain the Fe-based nanocrystalline alloy having excellent magnetic properties. Hereinafter, features of the alloy will be described in detail. However, an Fe-based nanocrystalline alloy to be described below may be used in a form of a metal thin plate, or the like, as well as powder. Further, this alloy may also be used in a transformer, a motor magnetic core, an electromagnetic wave shielding sheet, and the like, as well as the inductor.

Fe-Based Nanocrystalline Alloy

According to the research of the present inventors, it may be confirmed that at the time of preparing an Fe-based nanocrystalline alloy having a specific composition in a form of a particle having a relatively large diameter or a metal ribbon having a thick thickness, an amorphous property of a parent phase is high. A range of alloy composition of which the amorphous property of the parent phase and a saturation magnetic flux density were excellent was confirmed, and it was confirmed that the saturation magnetic flux density was improved as compared to the related art by particularly adding C and suitably adjusting a content of thereof. Here, the particle having a relatively large diameter may be defined as a particle having a $D_{50}$ of about 20 um or more. For example, the magnetic particles 111 have a $D_{50}$ within a range from about 20 to 40 um. Further, when the Fe-based nanocrystalline alloy is prepared in the form of the metal ribbon, the metal ribbon may have a thickness of about 20 um or more. However, the standards for the diameter or thickness are not absolute, but may be changed depending on situations.

In a case of heat-treating the alloy having a high amorphous property, a size of a nanocrystalline grain may be effectively controlled. More specifically, the Fe-based nanocrystalline alloy may be represented by Composition Formula, $(Fe_{(1-a)}M^1a)_{100-b-c-d-e-g}M^2{}_bB_cP_dCu_eM^3{}_g$, where $M^1$ is at least one element selected from the group consisting of Co and Ni, $M^2$ is at least one element selected from the group consisting of Nb, Mo, Zr, Ta, W, Hf, Ti, V, Cr, and Mn, $M^3$ is at least two elements selected from the group consisting of C, Si, Al, Ga, and Ge but necessarily includes C, and a, b, c, e, and g (based on at %) satisfy the following content conditions: 0≤a≤0.5, 1.5<b≤3, 10c≤13, 0≤d≤4, 0<e≤1.5, and 8.5≤g≤12, respectively. A parent phase of the alloy having the above-mentioned composition may have an amorphous single phase structure (or the parent phase may mostly have the amorphous single phase structure), and an average size of a crystalline grain after heat treatment may be controlled to be 50 nm or less.

In this case, magnetic properties such as permeability, a loss, or the like, may be affected by contents of P and C. Particularly, the magnetic properties may be significantly affected by the content of C. More specifically, it was confirmed that when a ratio of a weight of C to a sum of weights of Fe and C was 0.1% or more to 0.7% or less, excellent properties were exhibited.

Figure 4:
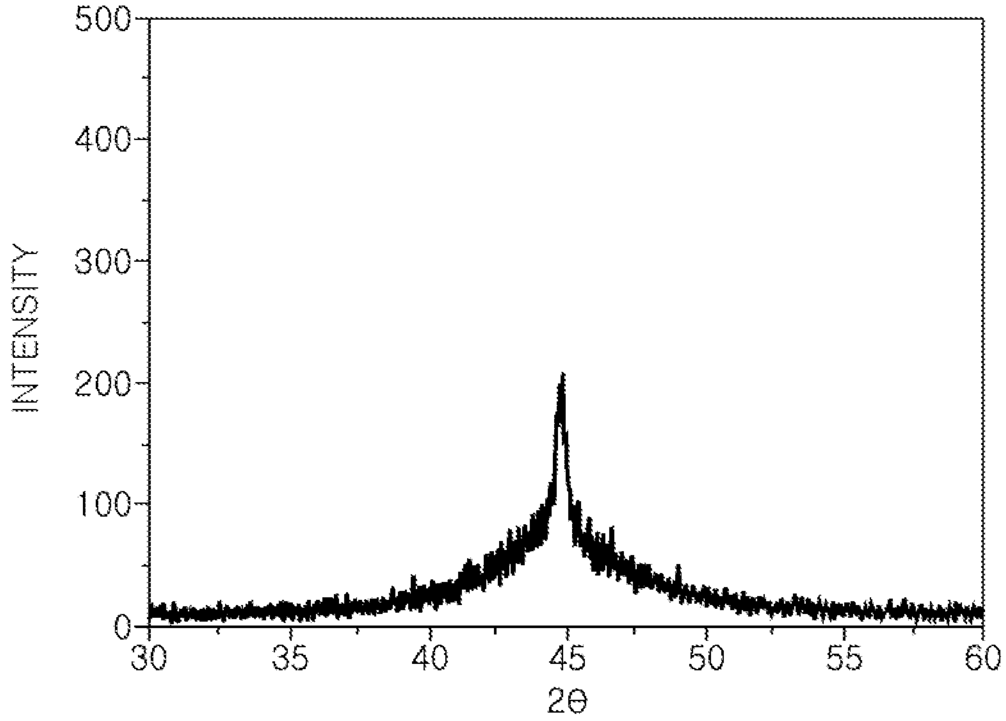
FIGS. 4 and 5 are graphs illustrating X-ray diffraction (XRD) analysis results of compositions according to Comparative Example and Inventive Example, respectively.
Figure 5:
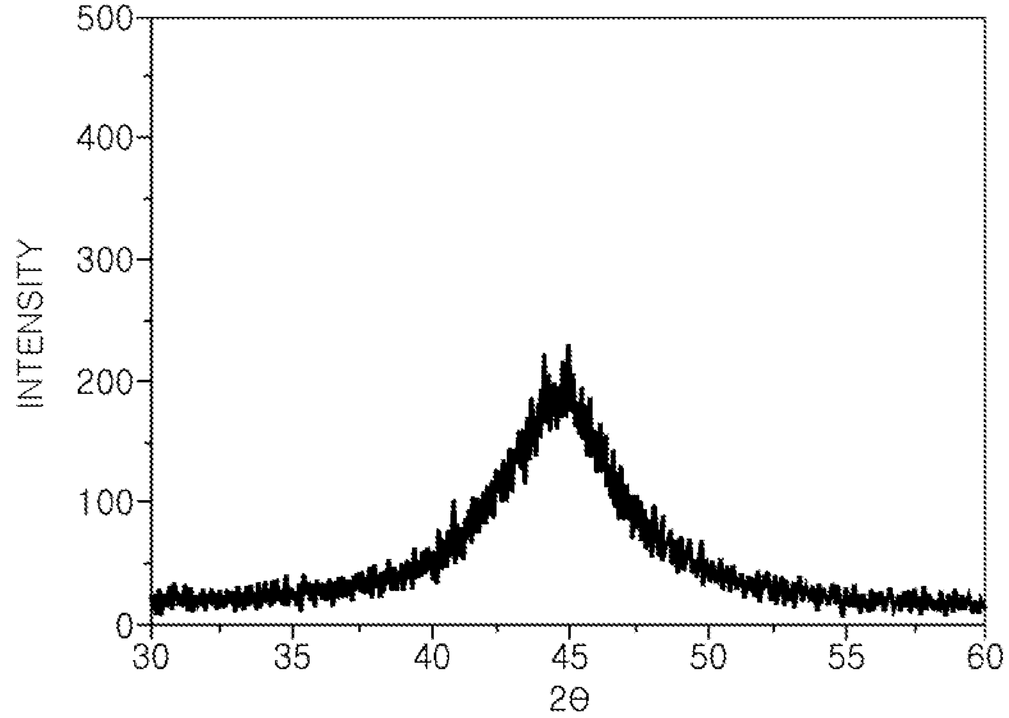
Figure 6:
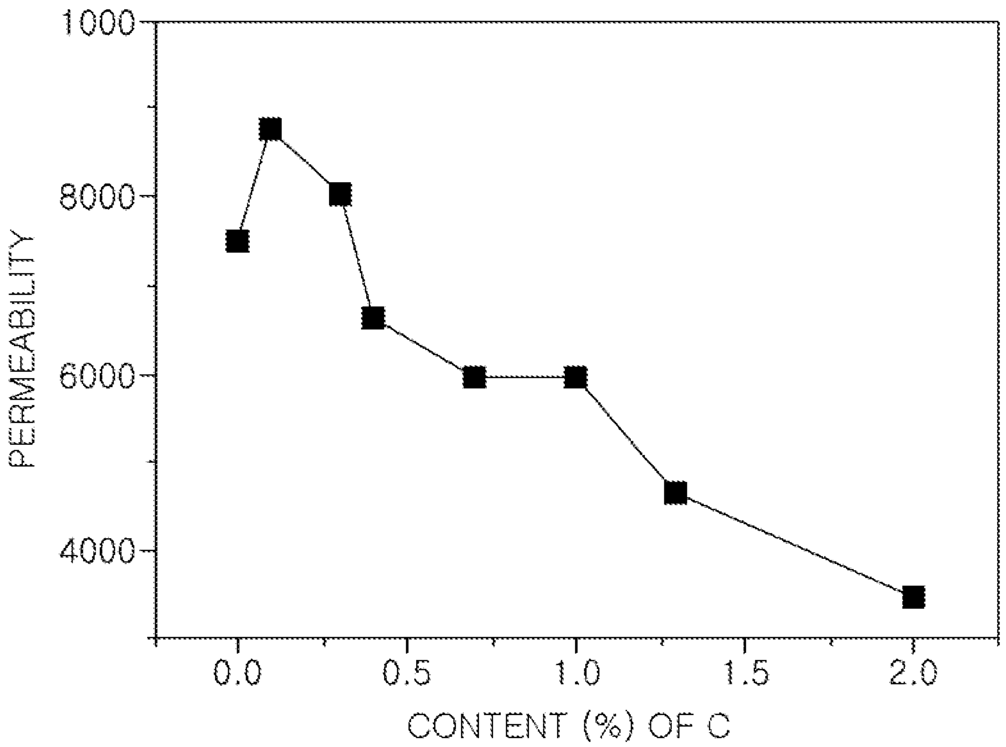
FIGS. 6 through 10 are graphs illustrating results in Table 2 depending on a content of C, wherein FIG. 6 corresponds to permeability, FIG. 7 corresponds to a core loss, FIG. 8 corresponds to a hysteresis loss, FIG. 9 corresponds to an eddy loss, and FIG. 10 corresponds to a saturation magnetic flux density.
Figure 7:
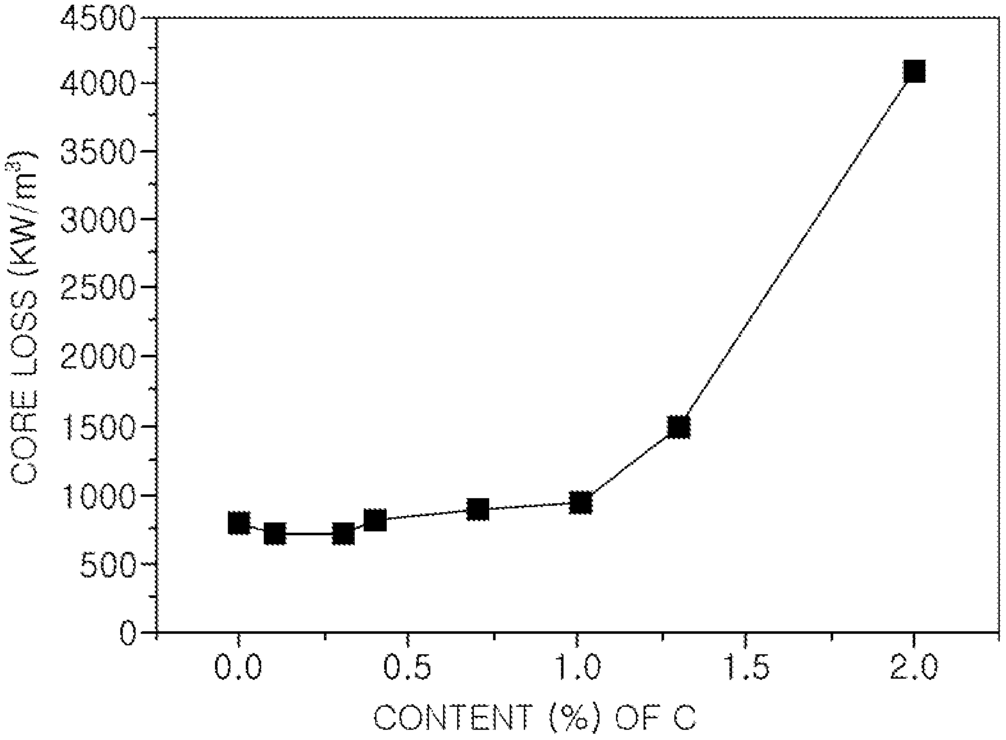
Figure 8:
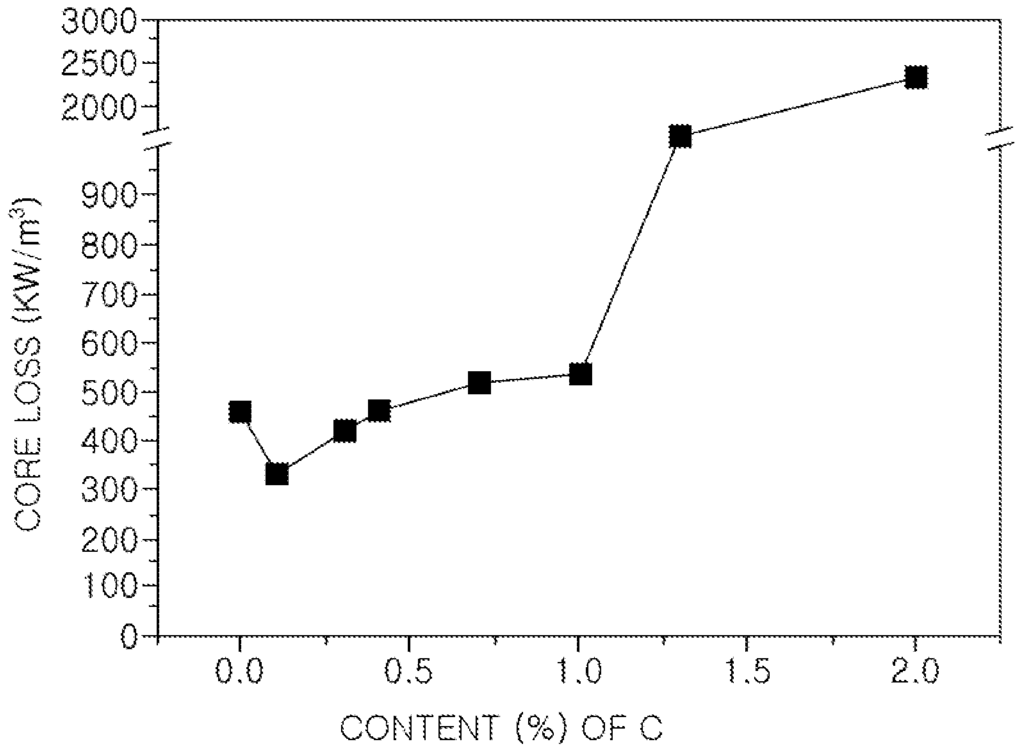
Figure 9:
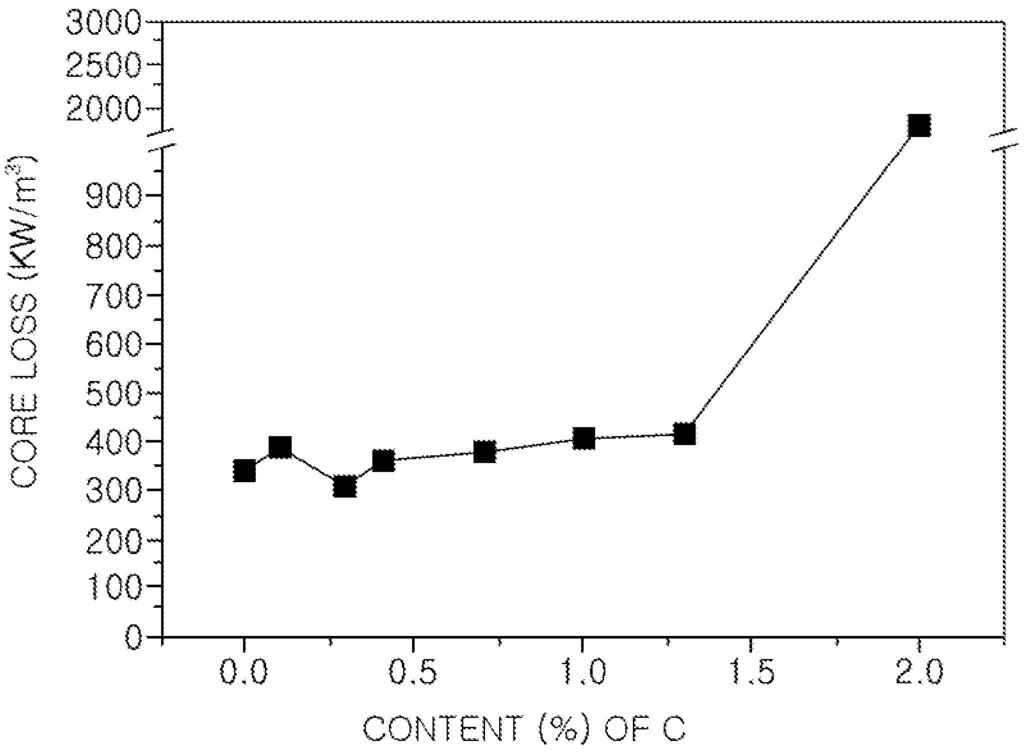
Figure 10:
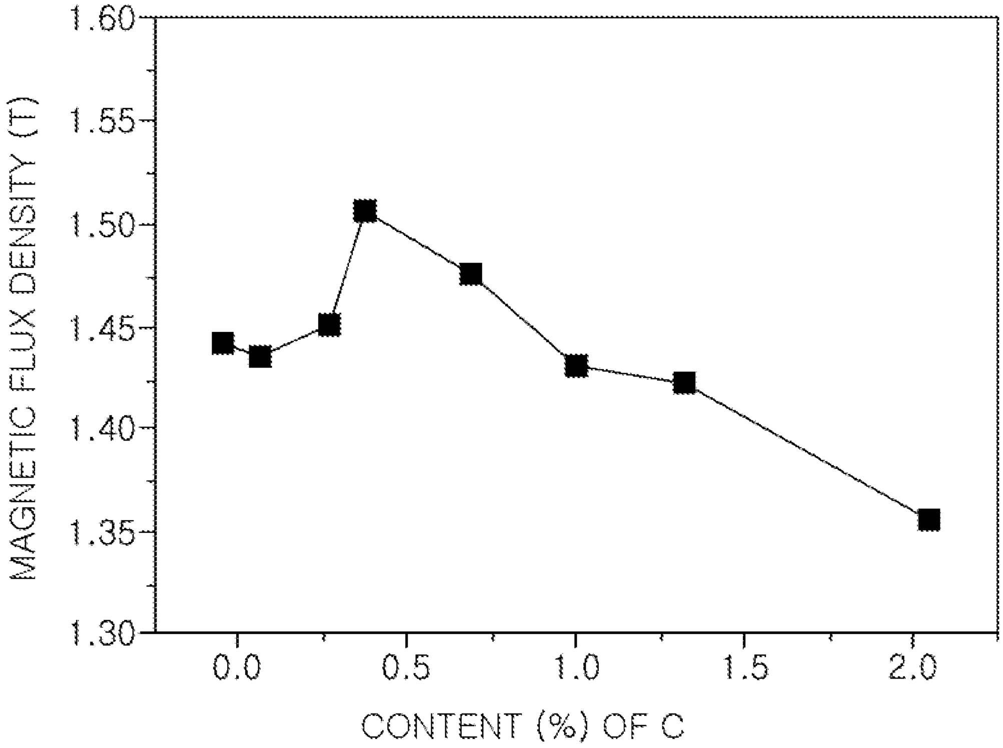

Hereinafter, experimental results of the present inventors will be described in more detail. The following Table 1 illustrates compositions according to Comparative Examples and Inventive Examples used in experiments, and a content of C was mainly changed. Further, FIGS. 4 and 5 are graphs illustrating X-ray diffraction (XRD) analysis results of the compositions according to Comparative Example and Inventive Example, respectively. More specifically, FIG. 4 illustrates the XRD analysis result of Comparative Example 1, and it may be appreciated that at the time of preparing a powder, the composition according to Comparative Example 1 was prepared in a powder state in which an amorphous phase and a crystalline phase were mixed with each other. FIG. 5 illustrates the XRD analysis result representing Inventive Examples, and these results were exhibited in all the compositions according to Inventive Examples. It may be confirmed from the results that at the time of preparing a powder, all the compositions according to Inventive Examples were prepared in an amorphous phase.

TABLE 1

| | | Fe | Si | B | Nb | Cu | C | P |
|---|---|---|---|---|---|---|---|---|
| Comparative | at % | 76.3 | 8.5 | 11 | 1.5 | 1 | | 1.7 |
| Example 1 | wt % | 87.4 | 4.9 | 2.4 | 2.9 | 1.3 | | 1.1 |
| Comparative | at % | 75.3 | 2 | 11 | 2.5 | 1 | 7 | 1.2 |
| Example 2 | wt % | 87.7 | 1.2 | 2.5 | 4.8 | 1.3 | 1.8 | 0.8 |
| Comparative | at % | 75.6 | 4 | 11 | 1.9 | 1 | 4.5 | 2 |
| Example 3 | wt % | 87.8 | 2.3 | 2.5 | 3.7 | 1.3 | 1.1 | 1.3 |

TABLE 1-continued

| | | Fe | Si | B | Nb | Cu | C | P |
|---|---|---|---|---|---|---|---|---|
| Comparative | at % | 75.5 | 5 | 12 | 2 | 1 | 3.5 | 1 |
| Example 4 | wt % | 87.7 | 2.9 | 2.7 | 3.9 | 1.3 | 0.9 | 0.6 |
| Inventive | at % | 76 | 6 | 11 | 1.5 | 1 | 2.5 | 2 |
| Example 1 | wt % | 87.9 | 3.5 | 2.5 | 2.9 | 1.3 | 0.6 | 1.3 |
| Inventive | at % | 76 | 7 | 11 | 1.5 | 1 | 1.5 | 2 |
| Example 2 | wt % | 87.5 | 4.1 | 2.5 | 2.9 | 1.3 | 0.4 | 1.3 |
| Inventive | at % | 76 | 7.5 | 11 | 1.5 | 1 | 1 | 2 |
| Example 3 | wt % | 87.5 | 4.3 | 2.5 | 2.9 | 1.3 | 0.2 | 1.3 |
| Inventive | at % | 76 | 8 | 11 | 1.5 | 1 | 0.5 | 2 |
| Example 4 | wt % | 87.4 | 4.6 | 2.4 | 2.9 | 1.3 | 0.1 | 1.3 |

The following Table 2 illustrates changes in magnetic properties (saturation magnetic flux density, permeability, core loss, hysteresis loss, and eddy loss) depending on a content of carbon (C) in each of the alloy compositions. Here, the content of carbon (C) was divided into and represented as at % of carbon and a weight ratio of the content of carbon with respect to a content of iron (Fe). Further, FIGS. 6 through 10 are graphs illustrating results in Table 2 depending on the content of C, wherein FIG. 6 corresponds to permeability, FIG. 7 corresponds to a core loss, FIG. 8 corresponds to a hysteresis loss, FIG. 9 corresponds to an eddy loss, and FIG. 10 corresponds to a saturation magnetic flux density.

TABLE 2

| Composition | Content of C (at %) | Content of C (C/Fe + C)) % | Bs (100 KHz) | Permeability (1000 Hz) | Core Loss (100 KHz) | Hysteresis Loss | Eddy Loss |
|---|---|---|---|---|---|---|---|
| Comparative Example 1 | 0 | 0 | 1.44 | 7523 | 793 | 454 | 339 |
| Comparative Example 2 | 7 | 2 | 1.356 | 3467 | 4116 | 2308 | 1808 |
| Comparative Example 3 | 4.5 | 1.3 | 1.423 | 4635 | 1499 | 1086 | 413 |
| Comparative Example 4 | 3.5 | 1 | 1.431 | 5962 | 943 | 538 | 405 |
| Inventive Example 1 | 2.5 | 0.7 | 1.475 | 5953 | 893 | 516 | 377 |
| Inventive Example 2 | 1.5 | 0.4 | 1.506 | 6628 | 815 | 459 | 356 |
| Inventive Example 3 | 1 | 0.3 | 1.451 | 8038 | 723 | 418 | 305 |
| Inventive Example 4 | 0.5 | 0.1 | 1.44 | 8768 | 709 | 326 | 383 |

It may be confirmed from the results in Table 2 and FIGS. 6 through 10 that as compared to the composition according to Comparative Example 1, in the other compositions including the composition according to Comparative Example 2, as C was added, an amorphous property was improved. Further, it may be confirmed that the magnetic properties were changed depending on the content of C. The magnetic properties were changed depending on the ratio of the weight of C to the sum of the weights of Fe and C. More specifically, permeability and loss properties tended to be excellent when the ratio of the weight of C was 1% or less. In addition, it may be confirmed that when the weight ratio of C was in a range of 0.1 to 0.7%, the saturation magnetic flux density was improved to 1.44 T or more as compared to the composition to which C was not added.

As described above, it may be confirmed from the results illustrated in Tables 1 and 2 that in the case of the Fe-based nanocrystalline alloy in which a specific content of P was added, even in a form of the powder having a size of 20 um or more, permeability, Bs (about 1.4 T or more), and core loss properties were excellent. Hereinafter, among the elements constituting the Fe-based nanocrystalline alloy, main elements except for Fe will be described.

Boron (B) is a main element for forming and stabilizing an amorphous phase. Since B increases a temperature at which Fe, or the like, is crystallized into nanocrystals, and energy required to form an alloy of B and Fe, or the like, which determines magnetic properties, is high, B is not alloyed while the nanocrystals are formed. Therefore, there is a need to add B to the Fe-based nanocrystalline alloy. However, when a content of B is excessively increased, there are problems in that nanocrystallization may be difficult, and a saturation magnetic flux density may be decreased.

Silicon (Si) may perform functions similar to those of B, and be a main element for forming and stabilizing the amorphous phase. However, unlike B, Si may be alloyed with a ferromagnetic material such as Fe to decrease a magnetic loss even at a temperature at which the nanocrystals are formed, but heat generated at the time of nanocrystallization may be increased. Particularly, in results of the research of the present inventors, it was confirmed that in a composition in which a content of Fe was high, it was difficult to control a size of a nanocrystal.

Niobium (Nb), an element controlling a size of nanocrystalline grains, may serve to limit crystalline grains formed of Fe, or the like, at a nano size, so as not to grow through diffusion. Generally, an optimal content of Nb may be about 3 at %, but in experiments performed by the present inventors, due to an increase in the content of Fe, it was attempted to form a nanocrystalline alloy in a state in which the content of Nb was lower than an existing content of Nb. As a result, it was confirmed that even in a state in which the content of Nb is lower than 3 at %, the nanocrystalline grain was formed, and particularly, in the composition range in which the content of Fe was high and crystallization energy of the nanocrystalline grain was formed in a bimodal shape, when the content of Nb was lower than the existing content of Nb, magnetic properties were rather improved, unlike general description that as the content of Fe is increased, the content of Nb needs to be also increased. It was confirmed that in a case in which the content of Nb was high, permeability corresponding to magnetic properties was rather decreased, and a loss was rather increased.

Phosphorus (P), an element improving an amorphous property in amorphous and nanocrystalline alloys, has been known as a metalloid together with existing Si and B. However, since binding energy with Fe corresponding to a ferromagnetic element is high as compared to B, when a Fe+P compound is formed, deterioration of magnetic properties is increased. Therefore, P was not commonly used, but recently, in accordance of the development of a composition having a high Bs, P has been studied in order to secure a high amorphous property.

Carbon (C) is an element improving an amorphous property in an amorphous and nanocrystalline alloys, and is known as a metalloid together with Si, B, and P. An addition element for improving the amorphous property may have a eutectic composition with Fe corresponding to a main element, and a mixing enthalpy with Fe has a negative value. The present inventors considered these properties of carbon to use carbon as an ingredient of the alloy composition. However carbon may increase coercive force of the alloy. Therefore, the present inventors secured a content range of carbon in which the amorphous property may be improved without an influence on soft magnetic properties.

Copper (Cu) may serve as a seed lowering nucleation energy for forming nanocrystalline grains. In this case, there was no significant difference with a case of forming an existing nanocrystalline grain.

As set forth above, according to exemplary embodiments in the present disclosure, the Fe-based nanocrystalline alloy having a low loss while having a high saturation magnetic flux density due to the excellent amorphous property of the parent phase, and the electronic component using the same may be implemented. The Fe-based nanocrystalline alloy as described above have advantages in that nanocrystalline grain may be easily formed even in a form of powder, and magnetic properties such as the saturation magnetic flux density, and the like, are excellent.

While exemplary embodiments have been shown and described above, it will be apparent to those skilled in the art that modifications and variations could be made without departing from the scope of the present invention as defined by the appended claims.

What is claimed is:

1. An electronic component comprising:

a coil part; and an encapsulant encapsulating the coil part and containing an insulator and magnetic particles dispersed in the insulator, wherein the magnetic particles contain an Fe-based alloy represented by composition formula, $(Fe_{(1-a)}M^{1}a)_{100-b-c-d-e-g}M^{2}_{b}B_{c}P_{d}Cu_{e}M^{3}_{g}$, where $M^1$ is at least one element selected from the group consisting of Co and Ni, $M^2$ includes NB, $M^3$ includes C and Si, and 0≤a≤0.5, 1.5<b≤3, 10c≤13, 0≤d≤4, 0<e≤1.5, and 8.5≤g≤12, and a, b, c, d, e and g are atom ratios, wherein a ratio of a weight of C to a sum of weights of Fe and C is within a range from 0.1% or more to 0.7% or less, wherein an absolute amount of C is within a range of 0.1 to 0.6 wt %, and wherein the magnetic particles have a size distribution with a $D_{50}$ of 20 um or more.

2. The electronic component of claim 1, wherein a parent phase of the Fe-based alloy has an amorphous single phase structure.

3. The electronic component of claim 1, wherein an average size of a crystalline grain after heat treatment is 50 nm or less.

4. The electronic component of claim 1, wherein a saturation magnetic flux density of the Fe-based alloy is 1.4 T or more.

5. The electronic component of claim 1, wherein a ratio of a weight of C to a sum of weights of Fe and C is within a range from 0.3% or more to 0.7% or less.

6. The electronic component of claim 1, wherein a ratio of a weight of C to a sum of weights of Fe and C is within a range from 0.4% or more to 0.7% or less.

* * * * *